(12) United States Patent
Kwon et al.

(10) Patent No.: US 12,399,635 B2
(45) Date of Patent: Aug. 26, 2025

(54) MEMORY SYSTEM AND OPERATION METHOD THEREOF

(71) Applicant: SK hynix Inc., Gyeonggi-do (KR)

(72) Inventors: Jung Hyun Kwon, Gyeonggi-do (KR); Dong Gun Kim, Gyeonggi-do (KR); Min Seob Lee, Gyeonggi-do (KR); Kwang Hyo Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/464,270

(22) Filed: Sep. 11, 2023

(65) Prior Publication Data
US 2024/0345749 A1 Oct. 17, 2024

(30) Foreign Application Priority Data

Apr. 13, 2023 (KR) .................. 10-2023-0048727

(51) Int. Cl.
*G06F 12/00* (2006.01)
*G06F 3/06* (2006.01)
*G06F 12/02* (2006.01)

(52) U.S. Cl.
CPC .......... *G06F 3/0634* (2013.01); *G06F 3/0616* (2013.01); *G06F 3/0625* (2013.01); *G06F 3/0683* (2013.01); *G06F 12/0223* (2013.01); *G06F 2212/1028* (2013.01); *G06F 2212/1036* (2013.01)

(58) Field of Classification Search
CPC .... G06F 3/0634; G06F 3/0616; G06F 3/0625; G06F 3/0683; G06F 12/0223; G06F 2212/1028; G06F 2212/1036
See application file for complete search history.

(56) References Cited

U.S. PATENT DOCUMENTS

| | | | |
|---|---|---|---|
| 2003/0126354 A1* | 7/2003 | Kahn ................. | G06F 12/0215 711/E12.004 |
| 2005/0060533 A1* | 3/2005 | Woo ................... | G06F 12/0215 711/E12.004 |
| 2009/0265514 A1* | 10/2009 | Biles .................. | G06F 12/127 711/135 |
| 2010/0161915 A1* | 6/2010 | Kim ................... | G06F 12/0215 711/E12.001 |
| 2012/0089789 A1 | 4/2012 | Shirlen et al. | |
| 2021/0201984 A1* | 7/2021 | Khasawneh ........ | G11C 11/4096 |

FOREIGN PATENT DOCUMENTS

KR 20100072707 A * 12/2008
KR 10-1598828 B1 3/2016

* cited by examiner

*Primary Examiner* — Hosain T Alam
*Assistant Examiner* — Mohammad S Hasan
(74) *Attorney, Agent, or Firm* — IP & T GROUP LLP

(57) ABSTRACT

A memory system includes a memory device comprising plural memory groups, and a controller configured to independently set or adjust a page close time or a page open time for a row or a page in each of the plural memory groups based on whether there is a request to be transferred into each of the plural memory groups.

19 Claims, 7 Drawing Sheets

FIG. 7

| Offset | Register Name | Register Value |
|---|---|---|
| 0x1234_0000 | close_time[0] | 0 |
| 0x1234_0004 | close_time[1] | 10 |
| 0x1234_0008 | close_time[2] | 20 |
| 0x1234_000C | close_time[3] | 30 |
| 0x1234_0010 | close_time[4] | 40 |

MEMORY SYSTEM AND OPERATION METHOD THEREOF

CROSS-REFERENCE TO RELATED APPLICATIONS

This patent application claims the benefit of priority under 35 U.S.C. § 119(a) to Korean Patent Application No. 10-2023-0048727, filed on Apr. 13, 2023, the entire disclosure of which is incorporated herein by reference.

TECHNICAL FIELD

One or more embodiments of the present disclosure described herein relate to a memory system, and more particularly, to a memory system, a memory device, and an operation method for activating a page or a row included in the memory device based on an access pattern.

BACKGROUND

A memory device or a memory system is typically used as an internal circuit, a semiconductor circuit, an integrated circuit, and/or a removable device in a computing system or an electronic apparatus. There are various types of memory, including a volatile memory and a non-volatile memory. The volatile memory may require power to maintain data. The volatile memory may include a random access memory (RAM), a dynamic random access memory (DRAM), a static random access memory (SRAM), a synchronous dynamic random access memory (SDRAM), and the like. The non-volatile memory can maintain data stored therein when power is not supplied. The non-volatile memory may include a NAND flash memory, a NOR flash memory, a Phase Change Random Access Memory (PCRAM), a Resistant Random Access Memory (RRAM), a Magnetic Random Access Memory (MRAM), etc. Improving the memory device or the memory system can include integrated control of different types of memory, reduced power consumption, increased reliability of data retention, protection from potential modifications to data values due to interruption in energy supply, and/or reduced manufacturing costs.

BRIEF DESCRIPTION OF THE DRAWINGS

The description herein makes reference to the accompanying drawings wherein like reference numerals refer to like parts throughout the figures.

FIG. 7 describes a table configured to store a page close time according to an embodiment of the present disclosure.

DETAILED DESCRIPTION

Figure 1:
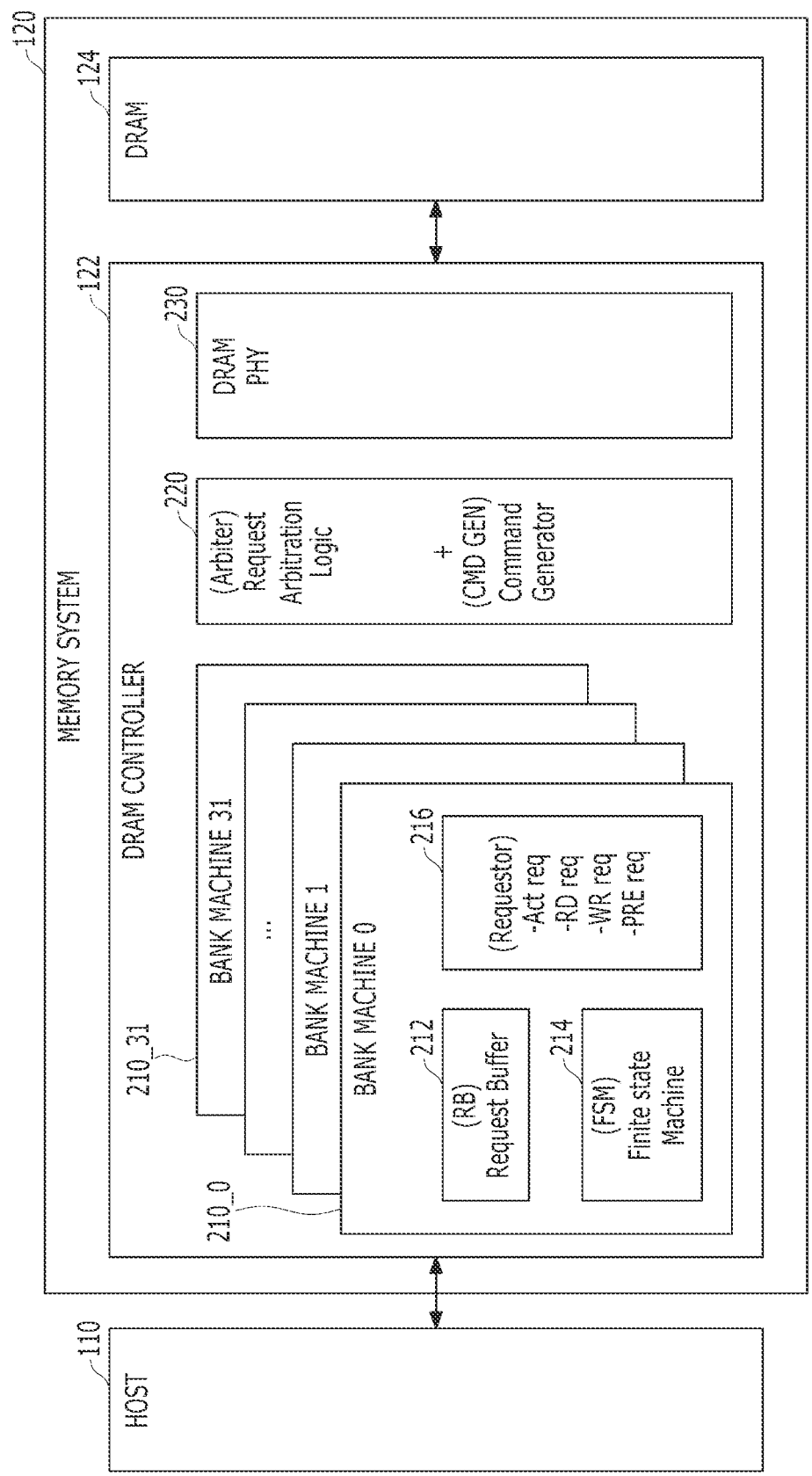
FIG. 1 illustrates a data processing system according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components e.g., an interface unit, circuitry, etc.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational, e.g., is not turned on nor activated. Examples of block/unit/circuit/component used with the "configured to" language include hardware, circuits, memory storing program instructions executable to implement the operation, etc. Additionally, "configured to" can include a generic structure, e.g., generic circuitry, that is manipulated by software and/or firmware, e.g., an FPGA or a general-purpose processor executing software to operate in a manner that is capable of performing the task(s) at issue. "Configured to" may also include adapting a manufacturing process, e.g., a semiconductor fabrication facility, to fabricate devices, e.g., integrated circuits that are adapted to implement or perform one or more tasks.

As used in this disclosure, the term 'machine,' 'circuitry' or 'logic' refers to all of the following: (a) hardware-only circuit implementations such as implementations in only analog and/or digital circuitry and (b) combinations of circuits and software and/or firmware, such as (as applicable): (i) to a combination of processor(s) or (ii) to portions of processor(s)/software including digital signal processor(s), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'machine,' 'circuitry' or 'logic' applies to all uses of this term in this application, including in any claims. As a further example, as used in this application, the term 'machine,' 'circuitry' or 'logic' also covers an implementation of merely a processor or multiple processors or a portion of a processor and its (or their) accompanying software and/or firmware. The term 'machine,' 'circuitry' or 'logic' also covers, for example, and if applicable to a particular claim element, an integrated circuit for a storage device.

As used herein, the terms 'first,' 'second,' 'third,' and so on are used as labels for nouns that they precede, and do not imply any type of ordering, e.g., spatial, temporal, logical, etc. The terms 'first' and 'second' do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term 'based on' is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the present invention can provide a memory device and a memory system including the memory device, which can reduce or avoid deterioration of data input/output performance as well as reduce power consumption.

According to an embodiment of the present invention, an apparatus and an operation method can be provided for activating or precharging a page or a row based on an operation state of a memory bank, an access pattern or history regarding the page or the row included in a memory device.

An embodiment of the present invention can provide an apparatus and an operation method for determining an increase and a decrease of a page close time in a memory bank based on whether the memory bank is open and a comparison result of an open row and a previous open row in the memory bank.

In an embodiment of the present invention, a memory system can include a memory device comprising plural memory groups; and a controller configured to independently set or adjust a page close time or a page open time for a row or a page in each of the plural memory groups based on whether there is a request to be transferred into each of the plural memory groups.

The controller can set or adjust the page close time by: checking whether there is an open row or an open page included in a selected memory group among the plural memory groups in response to a previous request transferred to the selected memory group before a current request; check whether the previous request and the current request are associated with a same row or a same page; and setting or adjusting the page close time for a row or a page in the selected memory group based on results of the checking.

The controller can set or adjust the page close time by maintaining the page close time when there is no open row or no open page in response to the previous request and the previous request and the current request are associated with different rows or different pages.

The controller can set or adjust the page close time further by increasing the page close time to a first time when there is no open row or no open page in response to the previous request and the previous request and the current request are associated with the same row or the same page.

The first time can be the longest preset time among plural preset times regarding the page close time.

The controller can set or adjust the page close time further by resetting the page close time to a second time shorter than the first time when there is an open row or an open page in response to the previous request and the previous request and the current request are associated with the same row or the same page.

The controller can set or adjust the page close time further by resetting the page close time to a third time shorter than the second time when there is an open row or an open page in response to the previous request and the previous request and the current request are associated with different rows or different pages.

The third time can be the shortest preset time among plural preset times regarding the page close time.

Each of the plural memory groups can be a memory bank coupled to the controller via a channel. The memory bank can include plural memory cells or at least one memory block.

The memory groups can share the channel with each other. Each of the memory group can include plural cell arrays coupled to a single row decoder.

The plural memory groups can share the channel with each other, the memory group including plural cell arrays coupled to plural row decoders.

The controller can include plural control machines, each control machine configured to set or adjust the page close time and the page open time for a corresponding memory group of the plurality memory groups; and a transceiver configured to transfer requests from the plural control machines into the memory device.

The control machine can set or adjust the page open time by: determining a third row or a third page which has a third address equal to a sum of a second address of a second row or a second page corresponding to the current request and a difference between the second address and a first address of a first row or a first page corresponding to the previous request; changing a number of estimated hits according to whether the third address is equal to an address corresponding to a next request to be transferred after the current request; and setting or adjusting, based on the number of estimated hits, the page open time for activating a row or a page of a corresponding memory group.

The control machine can change the number by: increasing the number of estimated hits when the third address is equal to the address corresponding to the next request; and decreasing the number of estimated hits when the third address is different from the address corresponding to the next request.

The control machine can be further configured to transfer, when the number of estimated hits is greater than a first preset reference, an activation request to the corresponding memory group based on the page open time before the next request is transferred into the corresponding memory group.

The control machine can be further configured to transfer a precharge request to the corresponding memory group based on the page close time for the corresponding memory group.

In an embodiment, a method for operating a memory system can include storing, in a buffer, requests to be transferred into each of plural memory banks; independently setting or adjusting, in response to the requests stored in the buffer, a page close time or a page open time for a row or a page in each of the plural memory banks; transferring, to at least one memory bank of the plural memory banks, a precharge request based on the corresponding page close time; and transferring, to at least one memory bank of the plural memory banks, an activation request based on the corresponding page open time.

The setting or adjusting of the page close time can include performing a first determination regarding whether there is an open row or an open page in a selected memory bank among the plural memory banks in response to a previous request which has been transferred into the memory bank before a current request; performing a second determination regarding whether the previous request and the current request are associated with a same row or a same page; and setting the page close time for a row or a page in the selected memory bank based on the first and second determinations.

The setting or adjusting of the page open time can include determining a third row or a third page which has a third address equal to a sum of a second address of a second row or a second page corresponding to the current request and a difference between the second address and a first address of a first row or a first page corresponding to the previous request; changing a number of estimated hits according to whether the third address is equal to an address corresponding to a next request to be transferred after the current request; and setting, based on the number of estimated hits, the page open time for activating a row or a page of the selected memory bank.

A memory bank among the plural memory groups can share a channel with another memory bank among the plural memory groups, the memory bank including plural cell groups coupled to plural row decoders.

In another embodiment, a memory system can include at least one memory chip comprising plural memory banks, each memory bank comprising plural volatile memory cells; and a controller coupled to the at least one memory chip via at least one channel and configured to: independently set or adjust, in response to a request to be transferred into each of the plural memory banks, a page close time or a page open time for a row or a page in each of the plural memory banks; and transferring, to at least one memory bank of the plural memory banks, one of a precharge request associated with the page close time and an activation request associated with the page open time.

Embodiments will now be described with reference to the accompanying drawings, wherein like numbers reference like elements.

FIG. 1 illustrates a data processing system according to an embodiment of the present disclosure.

Referring to FIG. 1, the data processing system may include a host 110 and a memory system 120. The host 110 and the memory system 120 may transmit and receive data to each other.

The host 110 may include a host processor. An example of a host processor is a central processing unit (CPU) in a computer system, which is capable of managing and coordinating overall operations of the computer system. The host 110 may perform calculations and tasks necessary to execute instructions or software applications and manage a computer's hardware resources. The host 110 may communicate with other components included in the data processing system, such as the memory system 120, an input/output device, and other processing devices, to ensure that data is properly stored, retrieved, and processed. In addition, the host 110 may manage data flow between different components in the data processing system and execute commands for controlling the overall operations of the computer system.

The memory system 120 may include a memory controller 122 and a memory device 124. The memory device 124 of FIG. 1 may include a Dynamic Random Access Memory (DRAM). According to an embodiment, the memory device 124 may include various types of memory including a volatile memory and a non-volatile memory.

The DRAM included in memory device 124 is a type of computer memory that stores each bit of data in a separate capacitor. Each memory cell including a capacitor can be disposed along rows and columns. Each row may include a plurality of memory cells. To read or write data from a specific memory cell in the DRAM, a row including the specific memory cell should be opened. When a row is opened, data stored in memory cells of the row could be accessible. This process may be referred to as "opening" or "activating" a row. In the DRAM, opening and closing a row every time a read or write operation might not be practical because opening the row takes a certain amount of time and energy. Further, to improve efficiency of the DRAM, multiple read/write operations can be performed on same rows while the rows in the DRAM are opened.

All rows could be closed when the DRAM is idle (i.e., enters an idle state). That is, in a closed state, memory cells included in the row could not be accessed for read or write operations. Closing a row can be referred to as "deactivation" or "precharge". When a row becomes inactive, data stored in the memory cells of the row could no longer be accessed and the memory cells could return to an initial state. After being closed, a row should be reopened to perform a new read or write operation. The reopening of the row may require some time and energy. Accordingly, the memory controller 122 could reduce the number of times a row is opened or closed or control a time when a row is opened or a time when a row is closed, in order to improve or optimize performance of the memory device 124.

According to an embodiment, the memory controller 122 may include at least one micro core processor. The micro core processor or a microcontroller could be understood as a specialized computer system designed to perform a specific task. Unlike a general-purpose processor designed to run a wide range of software applications, the micro core processor could be optimized for a specific feature set. The micro core processor may generally have a small amount of memory and may be designed to operate at low-power consumption. For example, a micro-core processor may include a small CPU (Central Processing Unit), a set of input/output interfaces, and a limited amount of memory. A micro core processor may include an additional hardware component such as an analog-to-digital converter, a timer, and a communication interface to provide additional functionality. Software for the micro core processor could be implemented with low-level programming languages such as assembly or C. The software could be designed to be optimized for a processor's specific hardware architecture. The memory controller 122 could include the micro-core processor for system cost reduction, power consumption reduction, or reliability improvement. Because a micro core processor is optimized for a specific task, the micro core processor may use or spend less memory and processing power than a general-purpose processor, so that a system including the micro core processor could reduce overall costs of the system. Further, the micro core processor consumes less power, making them suitable for battery-powered applications. According to an embodiment, the micro core processor may be more reliable because of being designed to perform a specific function in a controlled or limited environment.

According to an embodiment, the memory controller 122 may include at least one intellectual property (IP) core. An IP core refers to a pre-designed and pre-verified block of intellectual property (IP) that can be licensed and integrated into a larger system-on-chip (SoC) design. The IP core could be implemented as a reusable hardware component used or embedded in a design of complex digital systems such as a microprocessor, a digital signal processor, or other integrated circuits. The IP core can be designed to perform a specific function, such as a memory controller, a graphics processor, a digital signal processing (DSP) unit, or a communication interface. Examples of the IP cores can include ARM cores used in a mobile device, Ethernet interfaces used in a networking equipment, and USB interfaces used in a consumer electronic device. By including an IP core in the memory controller 122 to control data input/output operations for the memory device 124, development time and cost of the memory controller 122 could be reduced, and reliability and quality of the memory controller 122 could be improved.

The memory controller 122 may include a plurality of bank machines 210_0, . . . , 210_31, an arbiter 220, and a memory interface 230. The plurality of bank machines 210_0, . . . , 210_31 may individually correspond to each of a plurality of memory banks included in the memory device 124. For example, a first bank machine 210_0 may control an operation, or check a state, of a first memory bank included in the memory device 124. Referring to FIG. 1, when 32 memory banks are included in the memory device 124, the memory controller 122 may include 32 bank machines 210_0, . . . , 210_31.

Here, a memory bank can be understood as a partitioned area inside a memory device that operates sequentially so that data can be continuously transferred to the memory controller 122. The memory bank may include a logical grouping of one or more memories within a single channel. A memory bank will be described in detail with reference to FIGS. 2A and 2B.

The first bank machine 210_0 includes a request buffer 212 configured to store requests transmitted from the host 110, a finite state machine (FSM) 214 configured to manage an operating state of a corresponding memory bank included in the memory device 124, and a scheduling requester 216 configured to schedule a timing, an order, or a sequence for transferring the requests into the corresponding memory bank.

The request buffer 212 included in the first bank machine 210_0 may sequentially store at least one request to be transmitted to the corresponding memory bank in the memory device 124. For example, the request transmitted from the host 110 stored in the request buffer 212 may include a read request (RD req) or a write request (WR req). The bank machine 210_0 may work with a data buffer that temporarily stores write data transmitted along with a write request from the host 110 or temporarily stores read data output from the corresponding memory bank in the memory device 124.

The finite state machine (FSM) 214 in the first bank machine 210_0 may manage and control an operating state of a corresponding memory bank. For example, the finite state machine (FSM) may include a mathematical model used in a computer architecture to represent a behavior of the corresponding memory bank that may be in a different state. The finite state machine can be represented by a set of operating states, and each operating state may indicate a specific operation performed in the corresponding memory bank in the memory device 124. A memory bank in the memory device 124 may switch from one state to another state in response to operations performed by various requests input from the memory controller 122. The finite state machine (FSM) 214 may include a state transition table regarding a set of inputs and outputs, which can determine an operating state of the corresponding memory bank in the memory device 124. A transition table can list a current state, an input, and a next state. An output from the corresponding memory bank can have a functional relationship with the current state and the input. An operating state of the memory bank will be described later with reference to FIG. 3. The finite state machine (FSM) 214 may be implemented using a digital logic circuit such as a combinational logic and a sequential logic to represent a transition between an operating state and an output function. When the finite state machine (FSM) 214 is included in the first bank machine 210_0, simplicity, flexibility, and scalability of the memory controller 122 could be improved. The finite state machine (FSM) 214 can make it easier to design and test a hardware component by breaking down a complex operation into smaller and simpler states or simpler transitions. In addition, because the finite state machine (FSM) 214 can be modified or extended by adding a new operating state and a new transition into the transition table, flexibility in the design of the memory system 120 could be improved.

The request controller 216 included in the first bank machine 210_0 can receive a request stored in the request buffer 212 or a request generated by the finite state machine (FSM) 214 in response to control of the finite state machine (FSM) 214 and determine an order or a timing for a request's transmission to the memory device 124. For example, a read request or a write request may be transmitted after a corresponding memory bank in the memory device 124 is activated. Accordingly, before transmitting a read request (RD req) or a write request (WR req), the request controller 216 may transmit an activation request (ACT req) to the corresponding memory bank. Further, when an operation corresponding to the read request (RD req) or the write request (WR req) is completed, the request controller 216 may transfer a precharge request (PRE req) to the corresponding memory bank. Referring to FIGS. 4 to 7, it will be specifically described that the request controller 216 generates the activation request (ACT req) or the pre-charge request (PRE req) for activating or deactivating a row or a page in the corresponding memory bank.

A plurality of various requests transmitted from the plurality of bank machines 210_0, . . . , 210_31 can be delivered to the arbiter 220. The arbiter 220 may serve to manage memory accesses by the plurality of bank machines 210_0, . . . , 210_31 competing for the memory accesses at a same time. The memory controller 122 could work as a component that manages data flow between the memory device 124 and the host 110. Further, the arbiter 220 in memory controller 122 may determine which device should be granted access to the memory device 124 at a given time. Thus, the arbiter 220 can include an arbitration logic configured to manage multiple accesses and avoid a collision and a command generation logic configured to generate a control signal or command for solving an issue for the multiple accesses. For example, when the plurality of bank machines 210_0, . . . , 210_31 attempts to access the memory device 124 at a same time, the arbiter 220 can use a set of rules to determine which device should be given a priority access. These rules can be based on multiple factors such as a type of request, a priority level of the device, or a time of the request. The arbiter 220 can ensure that access to the memory device 124 could be shared fairly among the plurality of bank machines 210_0, . . . , 210_31 in the memory system. Further, if necessary, prioritizing a specific bank machine or a specific request type could be allowed. Through this procedure, the arbiter 220 can ensure that the memory system 120 operates efficiently and stably by avoiding a potential data collision.

A request passed through the arbiter 220 may be forwarded to the memory device 124 by the memory interface 230. The memory interface 230 may control and manage data communication between the memory controller 122 and the memory device 124. The memory controller 122 and the memory device 124 may be physically connected through a data communication line such as a channel or a bus. For example, a set of data lines, address lines, and control lines could be used to transfer data and commands between the memory controller 122 and the memory device 124. The memory interface 230 can control timings and synchronization regarding transmission and reception of data or requests transmitted between the memory controller 122 and the memory device 124 through the data communication line.

Examples of the memory interface 230 or a physical layer may include a double data rate (DDR) synchronous dynamic random access memory (SDRAM) interface. The DDR SDRAM is a type of memory commonly used in a computer and other digital devices. The DDR SDRAM interface can be configured to control and manage a physical layer that facilitates data transfer between memories, controllers, or other components. The DDR SDRAM interface is designed to provide a high bandwidth and a low latency, enabling fast and efficient data transfer between two different components.

Figure 2A:
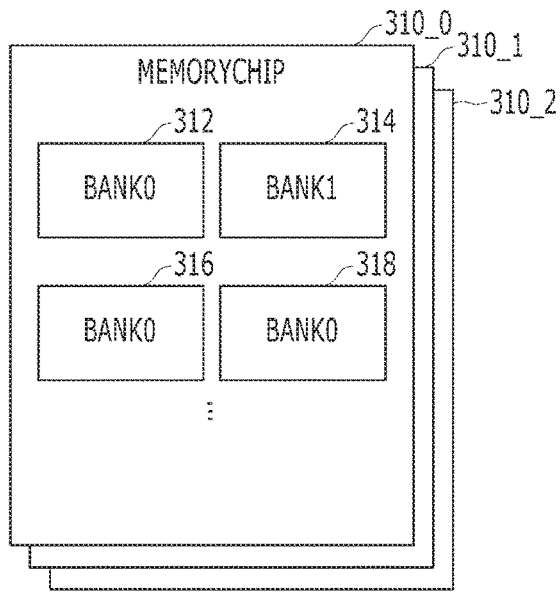
FIGS. 2A and 2B illustrate memory devices according to embodiments of the present disclosure.
Figure 2B:
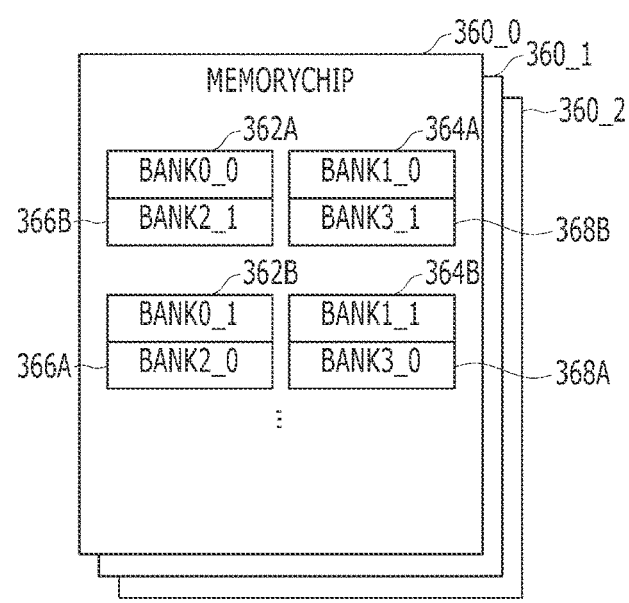

FIGS. 2A and 2B illustrate memory devices according to embodiments of the present disclosure. Specifically, FIGS. 2A and 2B illustrate a first memory device 124A and a second memory device 124B which are different embodiments of the memory device 124 described in FIG. 1. The first memory device 124A and the second memory device 124B described in FIGS. 2A and 2B are shown as examples for implementing the present invention. Configuration and an internal structure of the memory device 124 described in FIG. 1 might not be limited to the first memory device 124A and the second memory device 124B shown in FIGS. 2A and 2B.

A memory bank described in FIGS. 2A and 2B may refer to a set of specific memory modules included in the memory system 120 to provide more memory capacity (e.g., data storage capacity). The memory bank may include several memory modules (e.g., at least one row decoder, at least one data input/output circuit, etc.) designed to work together as a unit to provide a specific amount of memory capacity.

Referring to FIG. 2A, the first memory device 124A may include a plurality of memory chips 310_0, 310_1, 310_2. Each of the plurality of memory chips 310_0, 310_1, 310_2 may include a plurality of memory banks 312, 314, 316, 318. Herein, the number of memory chips included in the first memory device 124A and the number of memory banks included in each memory chip may vary depending on a storage capacity required for the memory system 120.

Referring to FIG. 2A, each of the memory banks 312, 314, 316, 318 may be understood as a group including a plurality of memory cells. Each of the memory banks 312, 314, 316, 318 is connected to a single row decoder, so that a plurality of rows, each row connected to a plurality of memory cells, can be activated or deactivated through a single row decoder. Each of the memory banks 312, 314, 316, 318 may be coupled to a data input/output circuit including a sense amplifier connected to a plurality of bit lines (e.g., a column direction). Each memory bank 312, 314, 316, 318 may include one row decoder and one data input/output circuit.

Referring to FIG. 2B, the second memory device 124B may include a plurality of memory chips 360_0, 360_1, 360_2. Each of the plurality of memory chips 360_0, 360_1, 360_2 may include a plurality of memory banks (e.g., 362A, 362B, 364A, 364B, 366A, 366B, 368A, 368B). Unlike the first memory device 124A, the second memory device 124B may include plural memory banks, each bank divided into two groups 362A, 362B, 364A, 364B, 366A, 366B, 368A, 368B. One memory bank in the second memory device 124B is divided into two groups 362A, 362B, so that each group 362A, 362B can activate a row or a page separately or simultaneously. Therefore, data inputs/outputs can be achieved through different row decoders and different data I/O circuits.

The second memory device 124B in which one memory bank uses two data input/output circuits and two row decoders to perform data input/output operations can have twice greater data input/output performance than the first memory device 124A in which one memory bank uses one data input/output circuit and one row decoder. But, the number of memory banks simultaneously performing data input/output operations in the second memory device 124B may be half the number of memory banks simultaneously performing data input/output operations in the first memory device 124A. Advantages and disadvantages due to these differences in operational characteristics may be different depending on characteristics of data requested by the host 110, a data processing speed of the host 110, or a data communication speed between the host 110 and the memory system 120. For example, when an ability of the host 110 and the memory controller 122 to evenly distribute data inputs/outputs over a plurality of memory banks is not great, the second memory device 124B having high data input/output performance of a specific memory bank may be preferred over the first memory device 124A. On the other hand, when the ability of the host 110 and the memory controller 122 to evenly distribute data inputs/outputs over the plurality of memory banks is great, the first memory device 124A in which the plurality of memory banks are evenly used may be preferred over the second memory device 124B in terms of lifespan and safety of the memory system 120.

Figure 3:
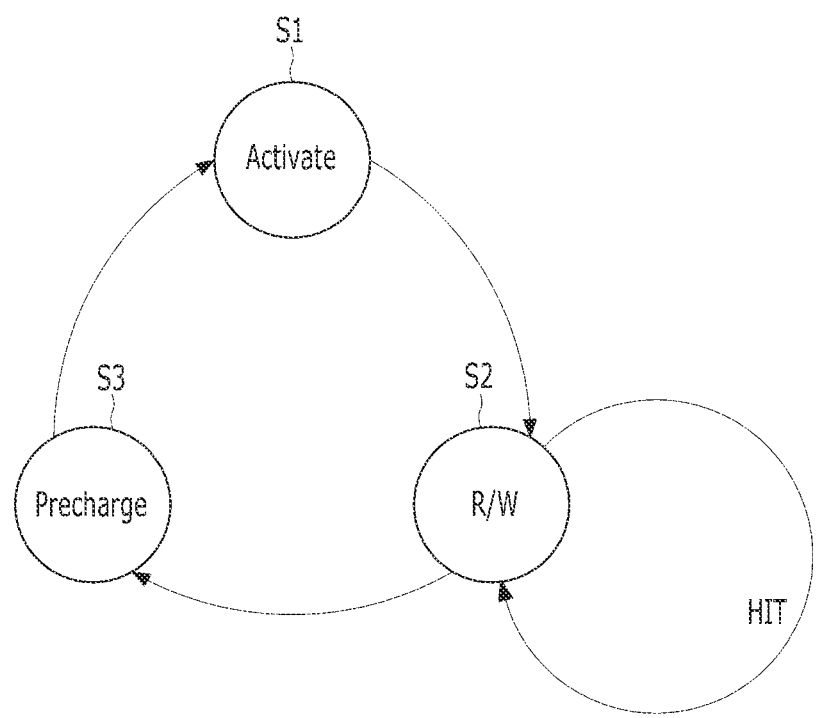
FIG. 3 illustrates transitions between operation states in a memory device according to an embodiment of the present disclosure.

FIG. 3 describes transitions between operation states in a memory device according to an embodiment of the present disclosure. Specifically, FIG. 3 is a conceptual diagram illustrating state transitions of the memory device 124 controlled and managed by the finite state machine 214 shown in FIG. 1.

As shown in FIG. 3, the finite state machine 214 can determine or control state transitions between an activation state S1, a read/write (R/W) state S2, and a the precharge state S3 of the memory device 124, based on a set of inputs, outputs, and information stored in a state transition table that is configured to determine an operating state of the memory bank. Referring to FIGS. 1 to 3, the finite state machine 214 is included in each of the plurality of bank machines 210_0, . . . , 210_31, so that the finite state machine 214 in each bank machine 210_0, . . . , 210_31 corresponding to each memory bank in the memory device 124 can control state transitions between operating states of the corresponding memory bank.

For example, a data input/output may occur in a memory bank which is in the read/write state S2. A case in which plural data input/output operations are continuously performed for a same address may be referred to as a hit (HIT). In the case of hit (HIT), the read/write state S2 may be continuously kept.

Each of the bank machines 210_0, . . . , 210_31 may transmit an activation request (ACT req) and a precharge request (PRE req) to a corresponding memory bank. When the precharge request (PRE req) is transmitted to the corresponding memory bank being in a read/write state S2, the corresponding memory bank may transition from the read/write state S2 to a precharge state S3. When an activation request (ACT req) is transmitted to the corresponding memory bank being in the precharge state S3, the corresponding memory bank may transition from the precharge state S3 to an activation state S1. When a specific memory bank is activated (i.e., the memory bank is in the activation state S1), a read request (RD req) or a write request (WR req) may be transferred to the corresponding memory bank.

Referring to FIGS. 1 to 3, the activation request (ACT req) and the precharge request (PRE req) can be transmitted from each of the bank machines 210_0, ..., 210_31 to a corresponding memory bank, so that deterioration of data input/output performance in the memory system 120 or the memory device 124 may be avoided. Further, power consumption of the memory system 120 or the memory device 124 could be reduced. Accordingly, the memory controller 122 can set a page open time and a page close time for determining timings for transferring the activation request (ACT req) and the precharge request (PRE req). Herein, the page open time and the page close time can be set or adjusted differently for each memory bank corresponding to each of the bank machines 210_0, ..., 210_31.

For example, each of the bank machines 210_0, ..., 210_31 can estimate a row or a page to be activated in a corresponding memory bank. Based on the number of successful estimates (i.e., the number of estimated hit), each of the bank machines 210_0, ..., 210_31 can increase or decrease the page open time or the page close time for transferring the activation request (ACT req) and the precharge request (PRE req) to open (or activate) or close (or deactivate) a specific row or page in the corresponding memory bank. In addition, each of the bank machines 210_0, ..., 210_31 may decrease or increase the page close time or the page open time in response to an operating state of the corresponding memory bank and whether a previous request and a current request are associated with a same row address. Hereinafter, a method and a device for individually and independently setting a page close time or a page open time of each memory bank corresponding to each of the bank machines 210_0, ..., 210_31 will be described in detail.

Figure 4:
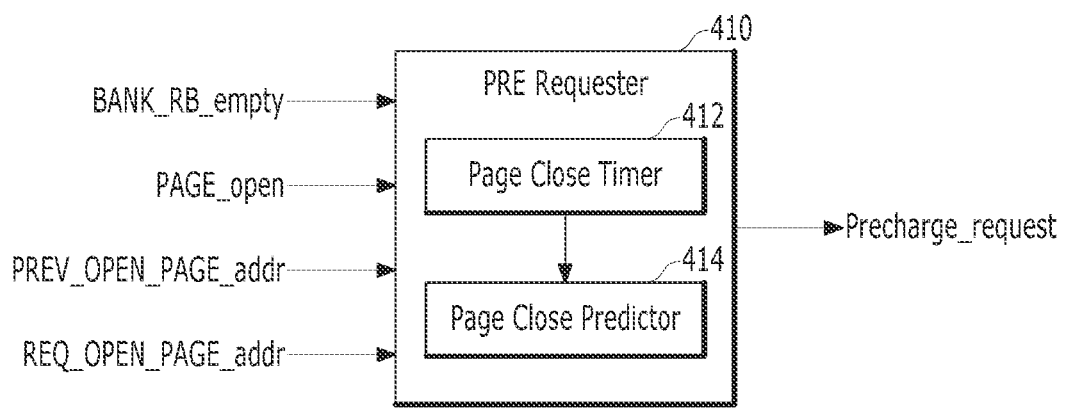
FIG. 4 illustrates a precharge operation requester according to an embodiment of the present disclosure.
Figure 5:
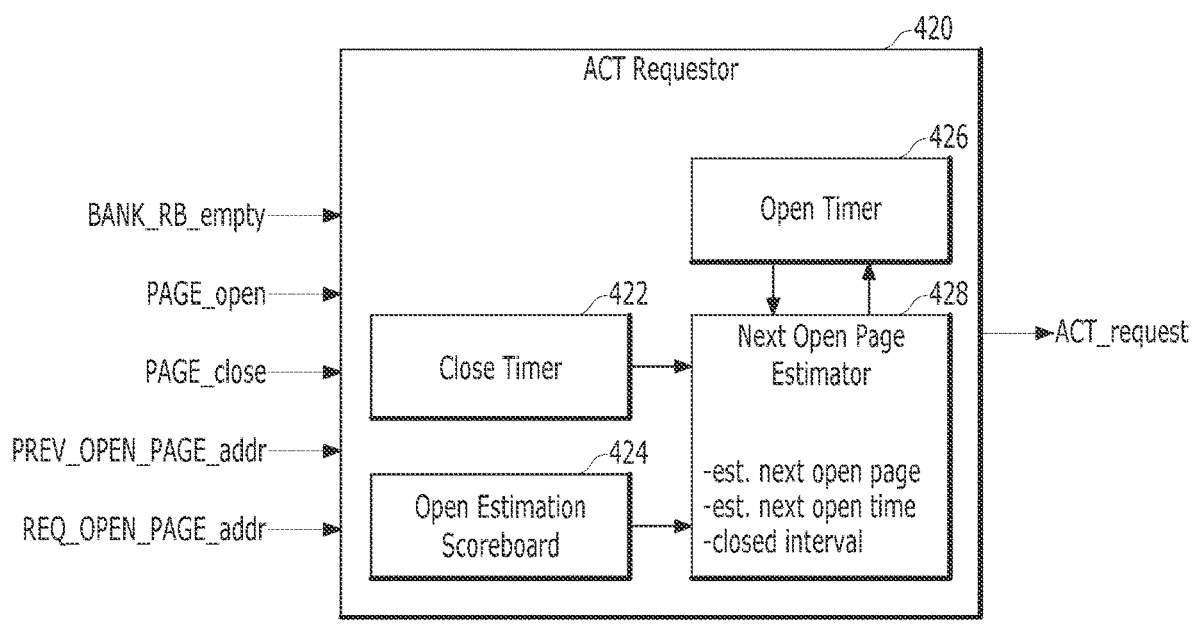
FIG. 5 illustrates a page activation requester according to an embodiment of the present disclosure.

According to an embodiment, the request controller 216 described in FIG. 1 may include a precharge operation requester 410 and a page activation requester 420 described in FIGS. 4 and 5.

FIG. 4 illustrates a precharge operation requester according to an embodiment of the present disclosure.

Referring to FIG. 4, the precharge operation requester 410 can include a first timer 412 configured to check the page close time and a first determination unit 414 configured to determine the page close time.

The precharge operation requester 410 may receive a bank idle signal BANK_RB_empty indicating whether the request buffer 212 is empty. The bank idle signal BANK_RB_empty may indicate whether there is a request stored in the request buffer 212 included in each of the bank machines 210_0, ..., 210_31. When there is no request stored in the request buffer 212, the corresponding memory bank may enter an idle state. A memory bank entering an idle state can indicate that no row in the memory bank needs to be open or active. Accordingly, the precharge operation requester 410 may set a page close time so that the corresponding memory bank transitions to the precharge state S3. If the request buffer 212 is not empty, the precharge_request (PRE req) may be generated in order to perform an operation corresponding to a next request stored in the request buffer 212.

The precharge operation requester 410 can receive a page open signal (PAGE_open) indicating whether an open or active row or page in a corresponding memory bank is requested, a first row or page address (PREV_OPEN_PAGE_addr) associated with a previous request, and a second row or page address (REQ_OPEN_PAGE_addr) associated with a current request.

The first determination unit 414 in the precharge operation requester 410 can determine whether a row or page in a corresponding memory bank is open at a specific time point through the first timer 412. For example, when the first timer 412 checking the page close time shows 1 second left, the precharge operation requester 410 can generate a precharge request for transitioning to the precharge state S3 to precharge a specific row or page in the memory bank after 1 second. When the first timer 412 checking the page close time indicates that there is no remaining time, the precharge operation requester 410 may have already generated the precharge request for transitioning to the precharge state S3 to precharge a specific row or page in the memory bank.

When a row or page in the corresponding memory bank is open at a specific point in time through the first timer 412 (e.g., when a precharge request corresponding to a previous request has not yet been transferred to the corresponding memory bank), the first determination unit 414 can receive a page open signal PAGE_open, a row or page address PREV_OPEN_PAGE_addr corresponding to a previous request, and a row or page address REQ_OPEN_PAGE_addr corresponding to a current request, to reset the page close time. For example, the first determination unit 414 can be configured to compare a row or page address PREV_OPEN_PAGE_addr corresponding to a previous request with a row or page address REQ_OPEN_PAGE_addr corresponding to a current request, to determine whether the previous request and the current request are associated with a same row or page address.

When the page open signal PAGE_open is activated and it is checked that the current request is for a same row or page as the previous request, the first determination unit 414 can increase the page close time or make the page close time longer. In this case, a timing at which the precharge request is transmitted to the corresponding memory bank could be delayed, so that an operation corresponding to the current request following the previous request could be performed in the corresponding memory bank, continuously, without precharge and activation operations. In this case, data input/output performance of the memory system 120 could be improved by removing an operation of unnecessarily closing and reopening the corresponding memory bank.

When the page open signal PAGE_open is activated and it is checked that the current request and the previous request are associated with different rows or pages, the memory controller 122 can close a previously activated row or page in the corresponding memory bank and open or activate another row therein. To this end, the first determination unit 414 may decrease a page close time, currently set, or reset the page close time to a shorter time than a current one. According to an embodiment, the first determination unit 414 may select the shortest preset page close time among a plurality of preset page close times. Then, the memory controller 122 can transmit the precharge request to the corresponding memory bank faster in response to the shorter page close time, and then transfer an activation request (ACT req) to the corresponding memory bank in response to the page open time.

When a row or a page in the corresponding memory bank is closed at a specific time point through the first timer 412 (e.g., the memory bank enters the precharge state S3 when a precharge request corresponding to a previous request is transferred to the corresponding memory bank), the first timer 412 may reset the page close time based on the page open signal PAGE_open. When the page open signal PAGE_open is activated and it is checked that the current request is for a same row or page as the previous request, the first determination unit 414 may set the page close time to the longest time. In this case, it may be determined that the corresponding memory bank is closed unnecessarily between the previous and current requests. Therefore, the first determination unit 414 sets the page close time to the longest time, thereby avoiding unnecessary closing of the row or the page in the corresponding memory bank.

If the page open signal PAGE_open is activated and it is checked that the current request is for the same row or page as the previous request, the first determination unit 414 can maintain a currently set page close time. In this case, the first determination unit 414 may determine that the page close time of the corresponding memory bank is appropriately set and there is no need to change or adjust the page close time.

FIG. 5 illustrates a page activation requester according to an embodiment of the present disclosure.

Referring to FIG. 5, the page activation requester 420 may include a second timer 422, an estimation success board 424, a third timer 426, and a second determination unit 428. The second timer 422 may show a timing of when a corresponding memory bank in the memory device 124 is closed. The third timer 426 may show a page open time for a corresponding memory bank. The estimation success board 424 may be configured to store the number of times the second determination unit 428 has succeeded in estimation. The second determination unit 428 may determine a timing for opening or activating the corresponding memory bank.

The page activation requester 420 may receive a bank idle signal BANK_RB_empty showing whether the request buffer 212 is empty. The bank idle signal BANK_RB_empty may indicate whether there is a request stored in the request buffer 212 included in each of the bank machines 210_0, . . . , 210_31. When there is no request stored in the request buffer 212, the corresponding memory bank may enter an idle state. A memory bank entering an idle state means that no row in the memory bank needs to be open or active. In the idle state, the page activation requester 420 does not need to perform estimation to generate or transfer the activation request (ACT req).

The page activation requester 420 can receive a page open signal (PAGE_open), indicating whether opening or activating a row or page in a corresponding memory bank is requested, and a page close signal (PAGE_close) indicating whether closing or inactivation of a row or page in the corresponding memory bank is requested. The page activation requester 420 can receive a row or page address (PREV_OPEN_PAGE_addr) associated with a previous request, and a row or page address (REQ_OPEN_PAGE_addr) associated with a current request.

The page activation requester 420 may receive the page close signal PAGE_close, and may recognize, through the second timer 422, how long the corresponding memory bank is maintained in a closed or inactive state. Using the second timer 422, the second determination unit 428 can recognize an inactivation time interval (closed interval) from a timing of transitioning a state of the corresponding memory bank to the closed or inactive state to a timing of generating the activation request ACT_request. The second determination unit 428 may estimate whether a next access to the corresponding memory bank will occur (est. next open time) during the inactivation time interval (closed interval). Based on this estimation, the page open time could be calculated. According to an embodiment, the second determination unit 428 may use an average value calculated from a preset number of closed intervals to determine the page open time. The page activation requester 420 may generate an activation request ACT_request based on the page open time.

The page activation requester 420 can be configured to receive a page open signal (PAGE_open) indicating whether a row or page in a corresponding memory bank is required to be opened or activated, a row or page address (PREV_OPEN_PAGE_addr) associated with the previous request, and a row or page address (REQ_OPEN_PAGE_addr) associated with the current request. The second decision unit 428 can receive the two row or page addresses (PREV_OPEN_PAGE_addr, REQ_OPEN_PAGE_addr), which are associated with the previous request and the current request, and calculate a difference between the two row or page addresses. Thereafter, the second determiner 428 can add the calculated difference value to the row or page address (REQ_OPEN_PAGE_addr) corresponding to the current request to estimate a row or page address corresponding to a next request (est. next request), i.e., predict a next open page corresponding to the next request.

For example, a row or page address (PREV_OPEN_PAGE_addr) corresponding to the previous request is '1' (i.e., a first row), and a row or page address (REQ_OPEN_PAGE_addr) corresponding to the current request is '3' (i.e., a third row). The second decision unit 428 adds '2', which is the difference between the two addresses, to '3' which is the row or page address (REQ_OPEN_PAGE_addr) corresponding to the current request, to estimate that a row or page address (est. next open page) could be '5' (i.e., a fifth row). As another example, a row or page address (PREV_OPEN_PAGE_addr) corresponding to the previous request is '2' (i.e., a second row), and a row or page address (REQ_OPEN_PAGE_addr) corresponding to the current request is '2' (i.e., the second row). The second decision unit 428 adds '0', which is the difference between the two addresses (i.e., the same address), to '2' which is the row or page address (REQ_OPEN_PAGE_addr) corresponding to the current request, to estimate that a row or page address corresponding to a next request. (est. next open page) could be '2' (i.e., the second row).

The second determination unit 428 in the page activation requester 420 can estimate whether a next access to the corresponding memory bank will occur (est. next open time), as well as estimate a row or page address corresponding to a next request (est. next open page). Further, the second determination unit 428 can check whether these estimations are correct (estimation hit). A result of whether the estimation of the second decision unit 428 is correct may be stored in the estimation success board 424. According to an embodiment, the estimation success board 424 may individually count whether the estimated next open time (est. next open time) and the estimated next open row address (est. next open page) are hit. The estimation success board 424 may increase the counted value (i.e., the number of times) if the estimation is correct (hit) and decrease the counted value (i.e., the number of times) if the estimation is incorrect (miss). If the counted value (i.e., the number of times) stored in the estimation success board 424 is greater than, or equal to, a preset reference value (e.g., if the estimation reliability is greater than or equal to the preset reference value), the second determination unit 428 can determine the estimated next open time (est. next open time) and the estimated next open row address (est. next open page), as well as generate an activation request (ACT_request) for activating a corresponding row in the corresponding memory bank in advance before a next request is transmitted.

Figure 6:
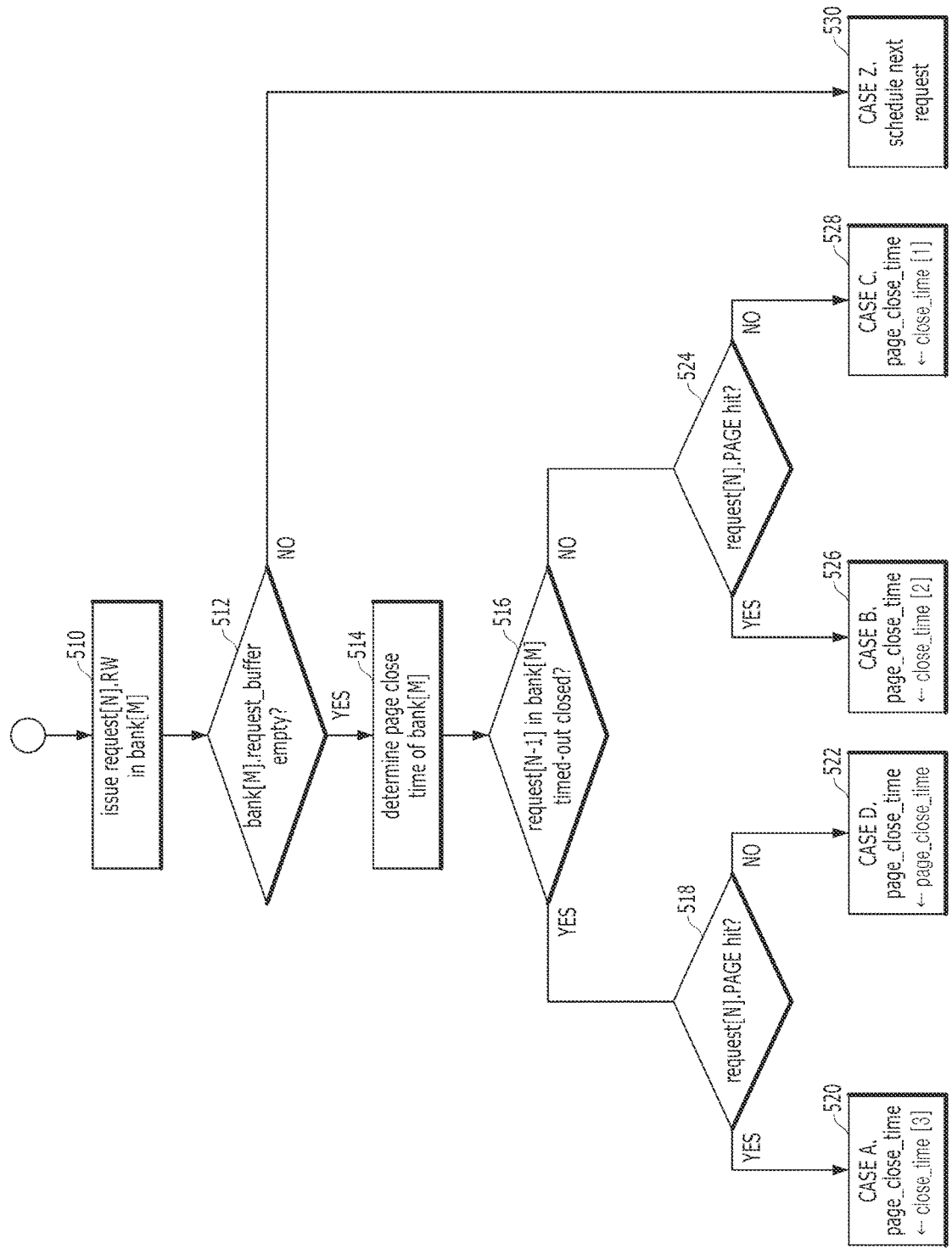
FIG. 6 is a flow chart illustrating a method for controlling a page close time according to an embodiment of the present disclosure.

FIG. 6 is a flow chart for illustrating a method for controlling a page close time according to an embodiment of the present disclosure.

According to an embodiment, the method for controlling the page close time described in FIG. 6 can be performed by the precharge operation requester 410 shown in FIG. 4, which could be included the memory controller 122 or the bank machines 210_0, . . . , 210_31 described in FIG. 1. Depending on the page close time, a state transition can occur from the read/write state S2 to the precharge state S3 among the operating states of the memory bank described with reference to FIG. 3.

Referring to FIG. 6, a read or write request request[N].RW to be performed in a corresponding memory bank bank[M] may be transferred to the corresponding bank (operation 510). An operating state of the corresponding memory bank bank[M] may enter the read/write state S2 described in FIG. 3.

The memory controller 122 may check whether the request buffer (request_buffer) for the corresponding memory bank (bank[M]) is empty (operation 512). When a next request is included in the request buffer (request_buffer) (NO in the operation 512), a page close time may be set to perform an operation corresponding to the next request (operation 530).

When the request buffer (request_buffer) for the corresponding memory bank bank[M] is empty (YES in the operation 512), the memory controller 122 can set or change a page close time of the corresponding memory bank (bank[M]) to make a state transition from the read/write state S2 to the precharge state S3 (operation 514).

However, as soon as the corresponding memory bank bank[M] transitions from the read/write state S2 to the precharge state S3, an access request such as a read or write request for the same row may be added to the request buffer (request_buffer). In this case, a bank machine among the plurality of bank machines 210_0, . . . , 210_31 in the memory controller 122 can reduce occurrence of unnecessary state transitions from the read/write state S2 to the precharge state S3 and from the precharge state S3 to the activation state S1.

The bank machine in the memory controller 122 may check whether the page close time corresponding to a previous request request[N−1] performed in the corresponding memory bank bank[M] has passed (operation 516).

If the page close time corresponding to the previous request request[N−1] performed in the corresponding memory bank bank[M] has passed (YES in the operation 516), the bank machine in the memory controller 122 may check whether rows or pages associated with the current request request[N] and the previous request request[N−1] are the same (PAGE hit) (operation 518).

If the rows or the pages corresponding to the current request request[N] and the previous request request[N−1] are the same (YES in the operation 518), the bank machine in the memory controller 122 can reset or adjust the page close time of the corresponding memory bank bank[M] to be longer than a previous one. Referring to FIGS. 6 and 7, the page close time of the memory bank bank[M] is set as the second longest time close_time[3] among a plurality of predetermined values (Register Value) regarding the page close time. In a first case (CASE A), an operation corresponding to the current request request[N] for the same row or page could be performed without a state transition of the memory bank bank[M] if the page close time corresponding to the previous request request[N−1] was sufficiently long and thus a state of the corresponding memory bank bank[M] did not directly transition from the read/write state S2 to the precharge state S3. According to an embodiment, the bank machine in the memory controller 122 may make the page close time of the corresponding memory bank bank[M] longer for the first case of the future. For example, the page close time of the memory bank bank[M] may be set to the longest time close_time[4] among the plurality of preset values (Register Value).

If the rows or the pages corresponding to the current request request[N] and the previous request request[N−1] are not the same (NO in the operation 518), the bank machine in the memory controller 122 can determine that the page close time of the corresponding memory bank bank[M] is maintained. In a fourth case (CASE D), in response to the page close time corresponding to the previous request request[N−1], the corresponding memory bank bank[M] can transition from the read/write state S2 to the precharge state S3. For performing an operation corresponding to the current request request[N] for another row or page, it is required that the corresponding memory bank bank[M] transitions from the precharge state S3 to the activation state S1. The bank machine in the memory controller 122 can determine that there is no problem in the state transition from the read/write state S2 to the precharge state S3 according to the page close time previously set corresponding to the previous request request[N−1].

If the page close time corresponding to the previous request request[N−1] performed in the corresponding memory bank bank[M] has not passed (NO of the operation 516), the bank machine in the memory controller 122 may determine whether the rows or the pages corresponding to the current request request[N] and the previous request request[N−1] are the same (PAGE hit) (operation 524).

If the rows or the pages corresponding to the current request request[N] and the previous request request[N−1] are the same (YES in the operation 524), the bank machine in the memory controller 122 can determine a page close time of the corresponding memory bank bank[M] as a shorter one than that in the first case (CASE A). Referring to FIGS. 6 and 7, the page close time of the memory bank bank[M] can be set as the third longest time close_time[2] among the plurality of preset values (Register Value) for the page close time. In a second case (CASE B), the bank machine in the memory controller 122 can extend the page close time corresponding to the previous request request[N−1], so that an operation corresponding to the current request request[N] could be continuously performed without any state transition of the memory bank bank[M]. According to an embodiment, the page close time of the memory bank bank[M] could be set or adjusted based on characteristics of data input/output operations performed in the memory device 124 (e.g., a value corresponding to the operation margin of the read or write operation).

If the rows or the pages corresponding to the current request request[N] and the previous request request[N−1] are not the same (NO in the operation 524), the bank machine in the memory controller 122 can set or adjust the page close time of the corresponding memory bank bank[M] to a shorter one than a previous page close time. In a third case (CASE C), the bank machine in the memory controller 122 can determine that it is better or necessary for improving performance that a state transition from the read/write state S2 in response to the page close time corresponding to the previous request request[N−1] of the corresponding memory bank bank[M] occurs more quickly because the corresponding memory bank bank[M] should make the state transition from the precharge state S3 to the activate state S1 for an operation corresponding to the current request request[N] for another row or page. If faster state transitions have occurred (from the read/write state S2 to the precharge state S3 and from the precharge state S3 to the activation state S1), the bank machine in the memory controller 122 can quickly precharge and then activate the corresponding memory bank bank[M] for the operation corresponding to the next request.

FIG. 7 illustrates a table configured to store a page close time according to an embodiment of the present disclosure.

Referring to FIG. 7, the memory system 120 or the memory controller 122 may include information including the plurality of preset values (Register Value) regarding the page close time.

According to an embodiment, in order to set the page close time or the page open time for a row or a page in a specific memory bank, the memory system 120 or the memory controller 122 may use real time by using a timer. For example, the memory system 120 or the memory controller 122 using the timer can have an advantage by finely setting or adjusting the page close time or the page open time. However, fine setting and fine adjustment might impose excessive overheads that are not directly related to data I/O operations of the memory bank in the memory device 124.

Moreover, operation characteristics (e.g., a data input/output speed, etc.) could be recognized or estimated according to an internal configuration of the memory device 124. When the memory system 120 or the memory controller 122 determines the page close time or the page open time based on the operation characteristics of the memory device 124, overheads for setting or adjusting the page close time or the page open time could be reduced. Further, efficiency for setting or adjusting the page close time or the page open time could be improved. Accordingly, the memory system 120 or the memory controller 122 determines the page close time or the page open time based on information including the plurality of preset values (Register Values) which is predetermined corresponding to the operating characteristics of the memory device 124.

As above described, a low-power memory device or a low-power memory system according to an embodiment of the present invention can reduce or avoid deterioration of data input/output performance.

In addition, a memory device or a memory system according to an embodiment of the present invention can increase or decrease a time for activating or deactivating a specific location (e.g., a page or a row) in the memory device or the memory system in response to an input/output request to the memory device or the memory system and a location corresponding to the input/output request. Therefore, data input/output performance of the memory device or the memory system could be maintained, and power consumption of the memory device or the memory system could be reduced.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods or operations of the computer, processor, controller, or other signal processing device, are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments or operations of the apparatus embodiments herein.

The controllers, processors, control circuitry, devices, modules, units, multiplexers, generators, logic, interfaces, decoders, drivers, generators and other signal generating and signal processing features of the embodiments disclosed herein may be implemented, for example, in non-transitory logic that may include hardware, software, or both. When implemented at least partially in hardware, the controllers, processors, control circuitry, devices, modules, units, multiplexers, generators, logic, interfaces, decoders, drivers, generators and other signal generating and signal processing features may be, for example, any of a variety of integrated circuits including but not limited to an application-specific integrated circuit, a field-programmable gate array, a combination of logic gates, a system-on-chip, a microprocessor, or another type of processing or control circuit.

When implemented at least partially in software, the controllers, processors, control circuitry, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods or operations of the computer, processor, microprocessor, controller, or other signal processing device, are described in detail, the code or instructions for implementing the operations of the method embodiments may transform the computer, processor, controller, or other signal processing device into a special-purpose processor for performing the methods described herein.

While the present teachings have been illustrated and described with respect to the specific embodiments, it will be apparent to those skilled in the art of the present disclosure that various changes and modifications may be made without departing from the spirit and scope of the disclosure as defined in the following claims. Furthermore, the embodiments may be combined to form additional embodiments.

What is claimed is:

1. A memory system comprising:
  a memory device comprising plural memory groups; and
  a controller configured to individually set or adjust a page close time or a page open time for a row or a page in each of the plural memory groups based on whether there is a request to be transferred into each of the plural memory groups, wherein the controller sets or adjusts the page open time by:

determining a third row or a third page which has a third address equal to a sum of a second address of a second row or a second page corresponding to a current request and a difference between a second address and a first address of a first row or a first page corresponding to a previous request, changing a number of estimated hits according to whether the third address is equal to an address corresponding to a next request to be transferred after the current request, and setting or adjusting, based on the number of estimated hits, the page open time for activating a row or a page of the corresponding memory group.

2. The memory system according to claim 1, wherein the controller sets or adjusts the page close time by:

checking whether there is an open row or an open page included in a selected memory group among the plural memory groups in response to the previous request transferred to the selected memory group before the current request, checking whether the previous request and the current request are associated with a same row or a same page, and setting or adjusting the page close time for a row or a page in the selected memory group based on results of the checking.

3. The memory system according to claim 2, wherein the controller sets or adjusts the page close time by maintaining the page close time when there is no open row or no open page in response to the previous request and the previous request and the current request are associated with different rows or different pages.

4. The memory system according to claim 3, wherein the controller sets or adjusts the page close time further by increasing the page close time to a first time when there is no open row or no open page in response to the previous request and the previous request and the current request are associated with the same row or the same page.

5. The memory system according to claim 4, wherein the first time is the longest preset time among plural preset times regarding the page close time.

6. The memory system according to claim 4, wherein the controller sets or adjusts the page close time further by resetting the page close time to a second time shorter than the first time when there is an open row or an open page in response to the previous request and the previous request and the current request are associated with the same row or the same page.

7. The memory system according to claim 6, wherein the controller sets or adjusts the page close time further by resetting the page close time to a third time shorter than the second time when there is an open row or an open page in response to the previous request and the previous request and the current request are associated with different rows or different pages.

8. The memory system according to claim 7, wherein the third time is the shortest preset time among plural preset times regarding the page close time.

9. The memory system according to claim 1, wherein each of the plural memory groups is a memory bank coupled to the controller via a channel, and wherein the memory bank comprises plural memory cells or at least one memory block.

10. The memory system according to claim 9, wherein the memory groups share the channel with each other, and wherein each of the memory groups comprises plural cell arrays coupled to a single row decoder.

11. The memory system according to claim 9, wherein the memory groups share the channel with each other, and wherein each of the memory groups comprises plural cell arrays coupled to plural row decoders.

12. The memory system according to claim 2, wherein the controller comprises:

plural control machines each configured to set or adjust the page close time and the page open time for a corresponding memory group of the plurality memory groups; and a transceiver configured to transfer requests from the plural control machines into the memory device.

13. The memory system according to claim 12, wherein each of the control machines changes the number by:

increasing the number of estimated hits when the third address is equal to the address corresponding to the next request; and decreasing the number of estimated hits when the third address is different from the address corresponding to the next request.

14. The memory system according to claim 13, wherein each of the control machines is further configured to transfer, when the number of estimated hits is greater than a first preset reference, an activation request to the corresponding memory group based on the page open time before the next request is transferred into the corresponding memory group.

15. The memory system according to claim 13, wherein each of the control machines is further configured to transfer a precharge request to the corresponding memory group based on the page close time for the corresponding memory group.

16. A method for operating a memory system, the method comprising:

storing, in a buffer, requests to be transferred into each of plural memory banks;

individually setting or adjusting, in response to the requests stored in the buffer, a page close time or a page open time for a row or a page in each of the plural memory banks;

transferring, to at least one memory bank of the plural memory banks, a precharge request based on the corresponding page close time; and transferring, to at least one memory bank of the plural memory banks, an activation request based on the corresponding page open time, wherein the setting or adjusting of the page open time comprises:

determining a third row or a third page which has a third address equal to a sum of a second address of a second row or a second page corresponding to the current request and a difference between the second address and a first address of a first row or a first page corresponding to the previous request;

changing a number of estimated hits according to whether the third address is equal to an address corresponding to a next request to be transferred after the current request; and setting, based on the number of estimated hits, the page open time for activating a row or a page of a selected memory bank among the plural memory banks.

17. The method according to claim 16, wherein the setting or adjusting of the page close time comprises:
performing a first determination regarding whether there is an open row or an open page in a selected memory bank among the plural memory banks in response to the previous request which has been transferred into the memory bank before the current request;
performing a second determination regarding whether the previous request and the current request are associated with a same row or a same page; and
setting the page close time for a row or a page in the selected memory bank based on the first and second determinations.

18. A memory system comprising:
at least one memory chip comprising plural memory banks each memory bank comprising plural volatile memory cells; and
a controller coupled to the at least one memory chip via at least one channel and configured to:
individually set or adjust, in response to a request to be transferred into each of the plural memory banks, a page close time or a page open time for a row or a page in each of the plural memory banks, and
transfer, to at least one memory bank of the plural memory banks, one of a precharge request associated with the page close time and an activation request associated with the page open time,
wherein the controller sets or adjusts the page open time by:
determining a third row or a third page which has a third address equal to a sum of a second address of a second row or a second page corresponding to a current request and a difference between the second address and a first address of a first row or a first page corresponding to a previous request,
changing a number of estimated hits according to whether the third address is equal to an address corresponding to a next request to be transferred after the current request, and
setting or adjusting, based on the number of estimated hits, the page open time for activating a row or a page of the corresponding memory bank.

19. The memory system according to claim 18, wherein the controller sets or adjusts the page close time by:
checking whether there is an open row or an open page included in a selected memory group among the plural memory banks in response to the previous request transferred to the selected memory group before the current request,
checking whether the previous request and the current request are associated with a same row or a same page, and
setting or adjusting the page close time for a row or a page in the selected memory group based on results of the checking.

* * * * *